United States Patent [19]
Larsen

[11] 3,819,000
[45] June 25, 1974

[54] SNOWMOBILE CONSTRUCTION
[75] Inventor: Robert T. Larsen, Menomonee Falls, Wis.
[73] Assignee: Outboard Marine Corporation, Waukegan, Ill.
[22] Filed: Oct. 12, 1972
[21] Appl. No.: 296,975

[52] U.S. Cl. .............................. 180/5 R, 180/54 A
[51] Int. Cl. ........................................... B60k 11/06
[58] Field of Search .......... 180/5 R, 9.24 A, 9.24 R, 180/54 A, 64 A

[56] References Cited
UNITED STATES PATENTS

| 862,250 | 8/1907 | Herman | 180/54 A |
| 1,560,351 | 11/1925 | Seidel | 180/64 A |
| 2,390,218 | 12/1945 | Lamb | 180/54 A |
| 2,644,541 | 7/1953 | Bachle | 180/54 A |
| 2,680,490 | 6/1954 | Dafoe | 180/54 A |
| 3,147,814 | 9/1964 | Suhre | 180/54 A |

OTHER PUBLICATIONS

"68 Eirnrude Skeeter" Advertising brochure of OMC, Milwaukee, Wisc. – 1968.
Popular Mechanics, Oct. 1967, p. 139.

Primary Examiner—Richard J. Johnson
Attorney, Agent, or Firm—Michael, Best & Friedrich

[57] ABSTRACT

Disclosed herein is a snowmobile including a hood which cooperates with a frame to define a closed compartment provided with a baffled air inlet means, together with an engine mounted in the compartment and including a cooling air shroud having an inlet communicating with the interior of the compartment and an outlet, and a fan for delivering cooling air through said shroud, a cooling air exhaust passage communicating with the outlet of the shroud and extending rearwardly between a seat and an endless track supported by the frame and having an outlet adjacent to said rear of the snowmobile. Also included in the compartment is a carburetor air inlet silencer having an inlet communicating with the interior of the compartment and an outlet communicating with the engine.

Also disclosed is a mounting system for an alternate firing internal combustion engine including a crankshaft and two cylinders and a plurality of resilient mounts supporting the engine from a frame with the axis of the crankshaft extending transversely of the frame and with the cylinder axes located in a generally vertical plane extending transversely of the frame. The resilient mounts are relatively soft in the vertical direction and relatively stiff in the direction transverse to the vertical direction and transverse to the crankshaft axis. Mounted on the engine crankshaft is the primary pulley of a variable speed transmission, which pulley is drivingly connected to a secondary pulley mounted from the frame forwardly of the crankshaft in the direction of relative stiffness of the mount.

Also disclosed is a bearing support including a housing supported from the snowmobile frame and including wall means defining a bore for passage of a shaft transmitting power from the engine, and a cavity extending outwardly from the bore, a bearing retainer located in the cavity, a bearing unit supported by the bearing retainer and engaging the shaft to permit shaft rotation relative to the retainer, and means located in the cavity and extending between the housing and the retainer for preventing transmission of sound and vibration from the retainer to the housing and for simultaneously preventing displacement of the retainer relative to the housing.

9 Claims, 6 Drawing Figures

PATENTED JUN 25 1974

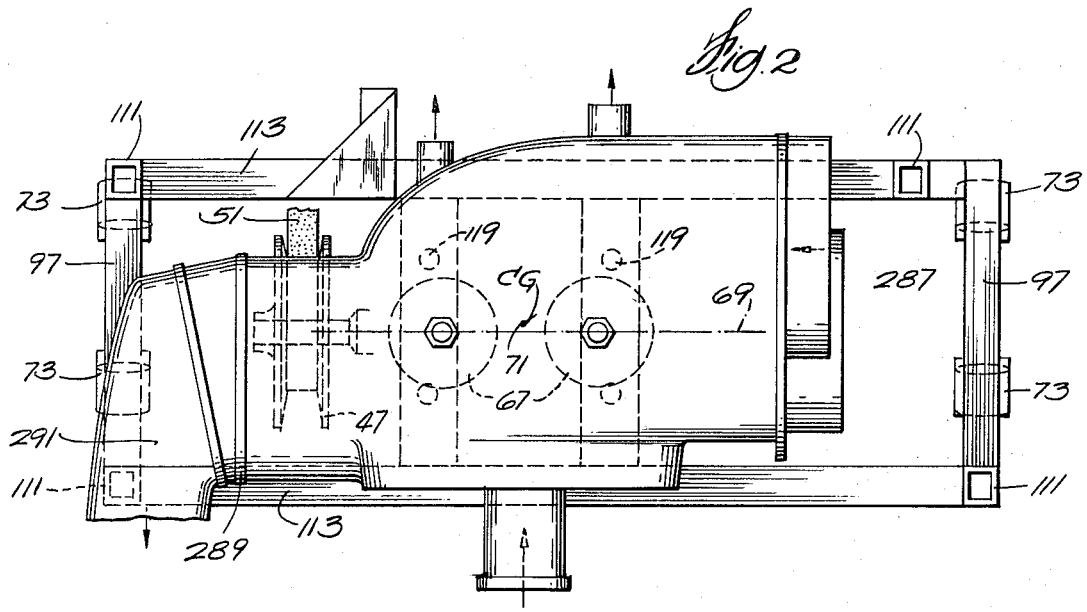
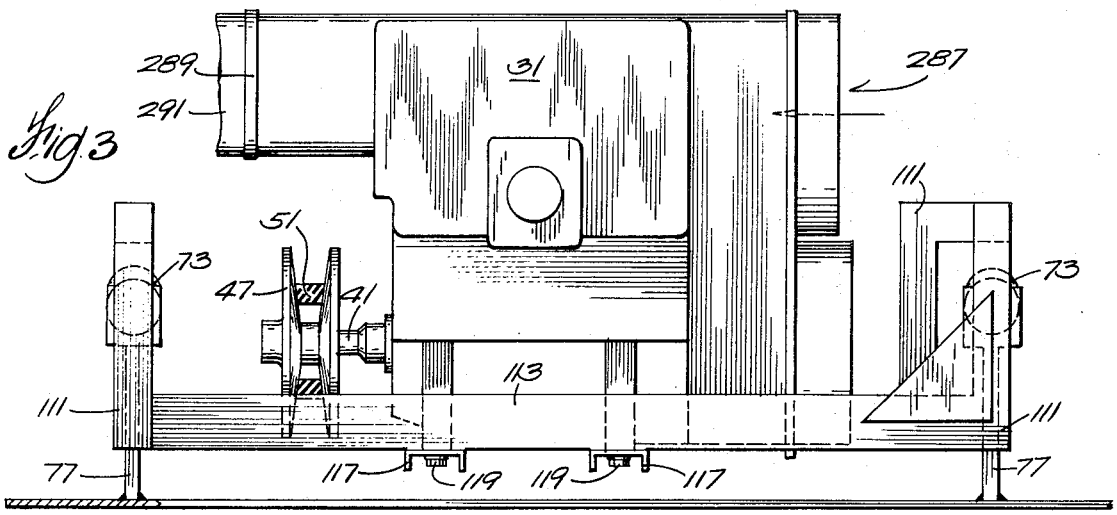
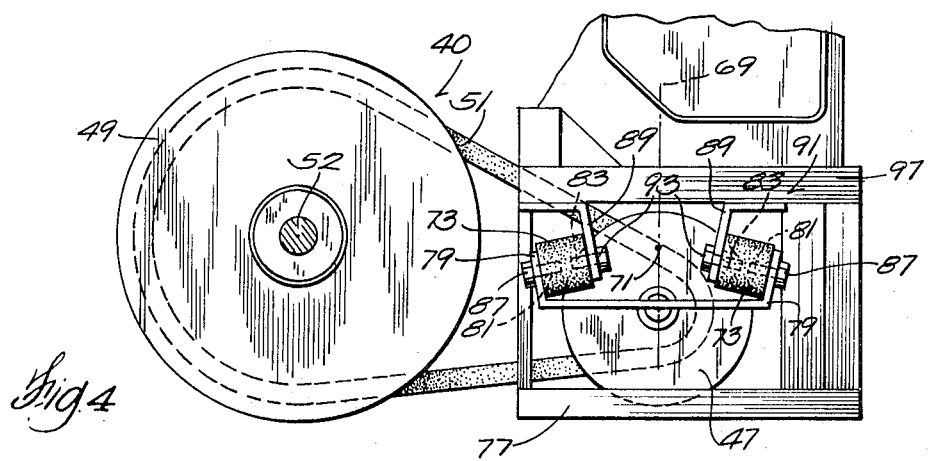

SNOWMOBILE CONSTRUCTION

BACKGROUND OF THE INVENTION

The invention relates generally to snowmobiles and more particularly to reduction of the noise level associated with snowmobile operation.

SUMMARY OF THE INVENTION

In accordance with the invention, various means are provided for reducing noise emanation from a snowmobile. More specifically, in accordance with one aspect of the invention, noise and vibration transmission from the engine and drive train to the snowmobile frame is substantially reduced by employment of an engine mounting system which is especially adapted for isolating an alternately firing two-cylinder engine and by a power train isloation system. Both the engine mounting system and the power train isolation system are arranged to maximize noise and vibration isolation without substantially adversely affecting power transmission. In particular, the arrangement of the engine isolation system and the power train permits engine vibration independently of the snowmobile frame without substantial variation in the distance between a primary pulley on the engine and a secondary pulley mounted from the frame and the power train isolation system beneficially serves to prevent sound and vibration transmission to the frame while maintaining substantially constant the dimensional spacing between various of the power transmitting components or elements.

According to another aspect of the invention, snowmobile noise emanation is reduced by employment of an engine compartment which is airtight except for a baffled air inlet and which includes arrangements for discharging exhaust gases through a muffler system in the compartment and under the snowmobile and for discharging cooling air through a circuitous passage including a duct located beneath the seat and above the endless belt or track, which duct has an outlet rearwardly of the operator or user.

One of the principal objects of the invention is the provision of a snowmobile which includes a two-cylinder alternate firing engine and an engine mounting system which isolates engine vibration from the supporting frame without substantially adversely affecting power delivery from the engine.

Another of the principal objects of the invention is the provision of a drive train isolation system which minimizes transmission from the drive train to the supporting structure of sound or noise and vibration while substantially maintaining dimensional stability.

Another of the principal objects of the invention is the provision of a snowmobile in which air flow relative to the engine is controlled to minimize noise emanation from the snowmobile.

Still another principal object of the invention is the provision of a snowmobile which is relatively quiet in operation.

Other objects and advantages of the invention will become known by reference to the following description, claims and accompanying drawings.
Drawings FIG. 1 is a schematic perspective view, partially broken away and in section, of a snowmobile embodying various of the features of the invention.

FIG. 2 is a top view of the engine mounting system incorporated in the snowmobile shown in FIG. 1.

FIG. 3 is a rear view of the engine mounting system shown in FIG. 2.

FIG. 4 is a side view of the engine mounting system shown in FIGS. 2 and 3.

Before explaining the invention in detail, it is to be understood that the invention is not limited in its application to the details of construction and arrangement of parts set forth in the following general description or illustrated in the accompanying drawings, since the invention is capable of other embodiments and of being practiced or carried out in various ways. Also, it is to be understood that the phraseology or terminology employed herein is for the purpose of description and not of limitation.

GENERAL DESCRIPTION

Figure 1:
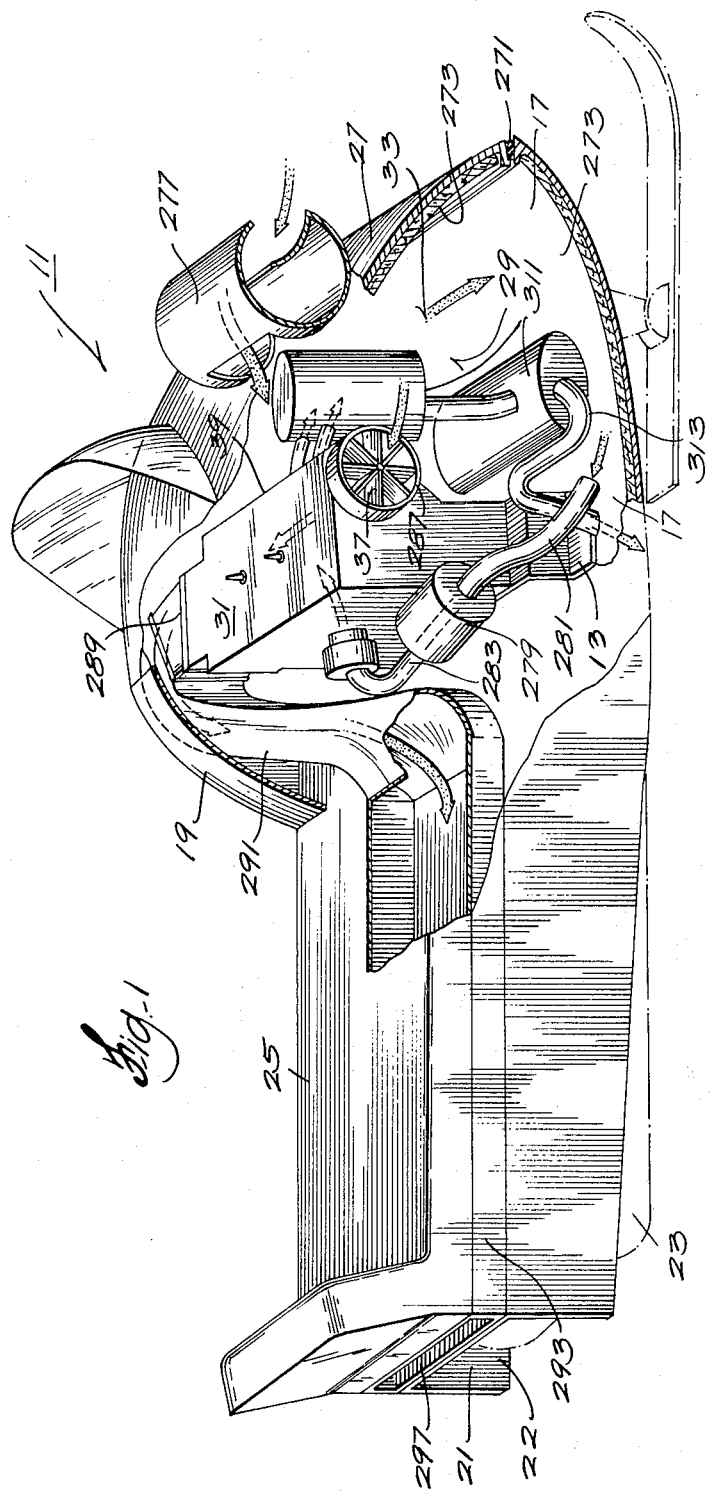

Shown in FIG. 1 is a snowmobile 11 including a frame 13 which is preferably metallic and which includes a generally horizontally extending, forward deck-like portion 17, a transverse wall or partition 19 extending upwardly at the rear of the forward frame portion 17, and a portion 21 which is of inverted U-shape, which defines a tunnel 22, which is principally located rearwardly of the partition 19, which houses an endless drive belt or track 23 and which supports a seat 25 rearwardly of the partition 19.

Figure 5:
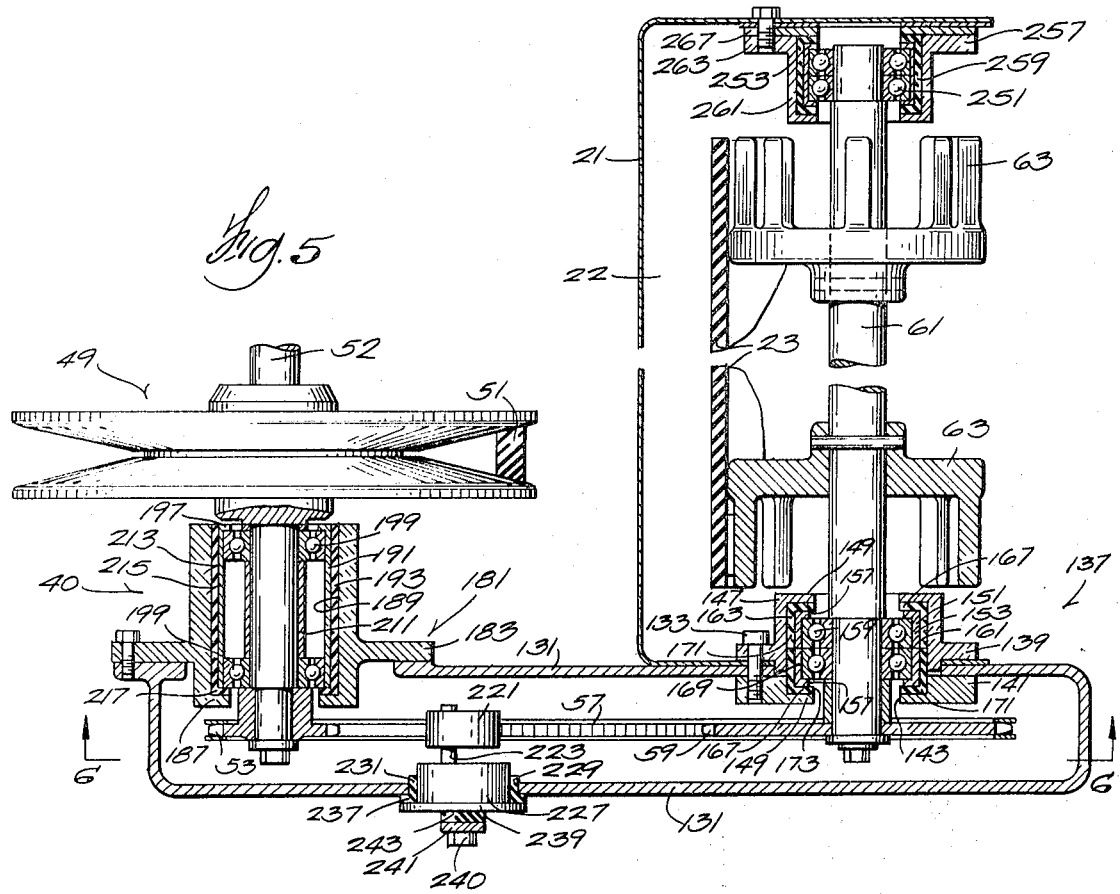
FIG. 5 is an enlarged sectional view illustrating a portion of the drive train included in the snowmobile shown in FIG. 1.
Figure 6:
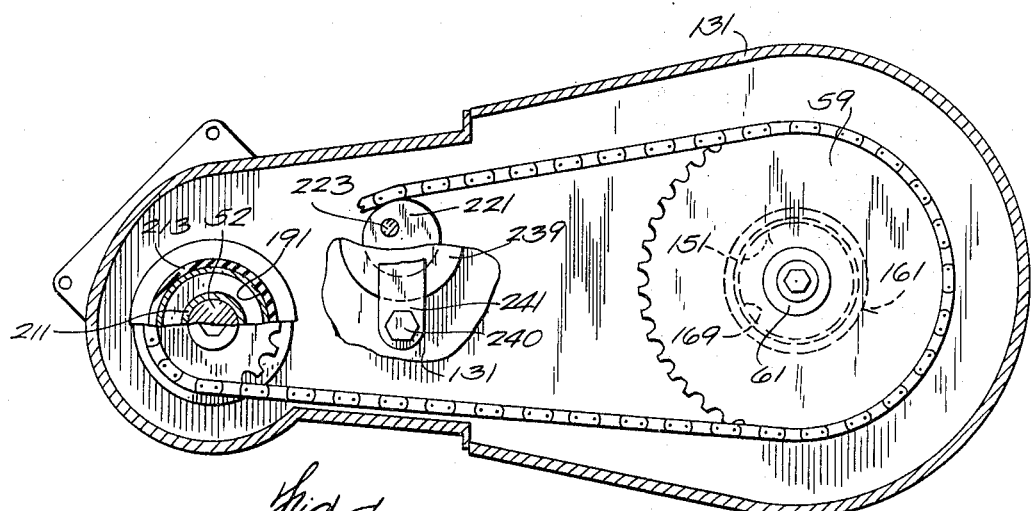
FIG. 6 is a view, partially broken away and in section, taken generally along line 6—6 of FIG. 5.

Forwardly of the partition 19 above the forward frame portion 17 is a hood 27 which is preferably curved throughout and which is releasably connectable to the partition 19 and to the forward frame portion 17 to define a compartment 29 including an internal combustion engine 31, and a suitable exhaust gas muffling system 33. The engine 31 is provided with a fan 37 which delivers cooling air relative to a shroud 39 and about the engine 31. In addition, the engine 31 includes a crankshaft 41 (See FIG. 3) which is connected to a power or drive train 40 (See (FIG. 5) comprising a variable speed transmission 43 (See FIG. 4) including a primary drive element or pulley 47 (See FIG. 3) which is preferably mounted on the crankshaft 41 and a secondary driven element or pulley 49 which is connected to the drive pulley 47 by an endless belt 51 and which is rotatably supported by the frame 13. In turn, the driven pulley 49 (See FIG. 5) is connected through a shaft 52 to a drive sprocket 53 having common rotation with the driven pulley 49. Trained around the drive sprocket 53 is a chain 57 which is also trained around a driven sprocket 59 carried on an axle 61 which is rotatably supported by the frame 13 and which extends transversely across the tunnel 22. Mounted on the axle 61 are one or more belt drive sprockets 63 which engage and drive the endless belt 23 which is located in the tunnel 22 and which is also movably supported from the frame 13 adjacent the rear of the tunnel 22.

In accordance with one aspect of the invention, the snowmobile 11 includes an engine mounting system which materially isolates or reduces transmission of noise and vibration from the engine 31 to the supporting frame 13 and which, as will also be described, cooperates with a drive or power train isolation system which also serves to isolate or minimize transmission to the frame of noise and vibration. In this regard, the illustrated engine 31 comprises two alternately firing cylinders 67 which are mounted with their axes extending generally vertically in a vertical plane 69 extending transversely of the snowmobile frame 13 by a plurality of resilient mounts 73 which are relatively soft in the vertical direction and relatively stiff in the direction transverse to the crankshaft axis and the plane 69.

The engine includes a center of gravity 71 which is approximately located in the transverse plane between the engine cylinders.

While other resilient mount supporting arrangements could be employed, in the illustrated construction, there is fixed to the frame 13 for support of the engine 31 two transversely spaced and vertically extending plates 77 which, at their upper ends, each include a pair of abutments 79 which are spaced fore and aft on opposite sides of the engine center of gravity, which diverge upwardly and slightly outwardly, and which are each respectively connected to one of the resilient mounts 73.

While various forms of resilient mounts could be employed, in the illustrated construction, the resilient mounts 73 each comprise a cylindrical pad of rubber or other suitable resilient material. Extending from each end of each mount 73 are respective oppositely extending threaded mounting studs 81 and 83 which are bonded to the rubber material and which are independent of one another. In particular accordance with the invention, the mounts 73 are relatively stiff in the axial direction of the studs 81 and 83 and are relatively soft in the direction transversely of the studs 81 and 83. As shown in the drawings, the studs 81 at one of the ends of the mounts 73 extend through openings in the abutments 79 and are fixedly connected thereto by nuts 87. At their other ends, the rubber mounts 73 are connected to apertured abutments 89 which extend in downwardly and slightly converging relation from an engine sub-frame 91. More specifically, the studs 83 extend through apertures in the abutments 89 and are fixed thereto by nuts 93.

While other specific constructions could be employed, in the disclosed construction, the engine sub-frame 91 includes two transversely spaced, and forwardly and rearwardly extending, beams 97 from which the abutments 89 depend. At their ends, the beams 97 are supported at the tops of forwardly and rearwardly spaced, and vertically extending posts 111 which, at their lower ends, are connected to forwardly and rearwardly spaced and transversely extending cross supports 113. Bridging the cross supports 113 inwardly of the posts 111 are a pair of spaced fore and aft members 117 which are apertured for receipt of engine mounting studs 119 to which nuts are applied to fix the engine 31 to the subframe 91.

Thus, the resilient mounts 73 are arranged in port and starboard pairs which are located laterally outwardly from the engine center of gravity and, in the specifically illustrated construction, laterally outwardly of the engine 31. In each pair, the resilient mounts 73 are symmetrically arranged forwardly and rearwardly of the transverse plane 69 containing the engine center of gravity.

Because the engine mounts 73 are relatively stiff in compression in the direction of the axis of the studs 81 and 83, i.e., in the direction of the mount axis, the engine, and particularly the crankshaft 41, is substantially rastrained against fore and aft movement. However, because the resilient mounts 73 are relatively soft in deflection, i.e., in the transverse direction relative to the mount axis, the mounts 73 are capable of absorbing vertical vibration resulting from the shaking forces which are characteristic of an alternately firing engine.

As a consequence of the engine mounting just described, transmission of engine vibration through the engine mounting system is substantially eliminated without adversely affecting power delivery to the drain train. Further in this regard, and in accordance with the invention, the drive train includes the before mentioned variable speed transmission 43 including the driving pulley 49 which is mounted on the engine crankshaft 41 and the driven pulley 49 which is mounted on the shaft 52 which extends in forwardly spaced parallel relation to the crankshaft 41 and sligtly above the crankshaft 41. In this last regard, the axis of the driven pulley 49 is located forwardly and above the crankshaft axis 41 such that a line joining the driven pulley axis and the crankshaft axis is approximately parallel to the axis of the rearward resilient mounts 73. Accordingly, because resilient mounts 73 are relatively stiff in the direction of their axes, there is little or no deflection along such axes and the distance between the driven pulley axis and the crankshaft axis remains substantially constant, notwithstanding engine vibration in the vertical direction. At least some of the advantages of the invention can be obtained when the line extending between the driven pulley axis and the crankshaft axis is out of exact alignment with the axis of the rearward resilient mounts, so long as the resilient mounts are effective to minimize variation in the distance between the driven pulley axis and the crankshaft axis while, at the same time, isolating engine vibration.

Also in accordance with the invention, there is provided a system or arrangement for mounting the drive train 40 from the frame 13 so as to prevent noise or vibration transmission to the frame 13. In this regard, the rotary components of the drive train are resiliently mounted in such manner as to maintain substantially constant the relative spacing of such rotary components, while at the same time, avoiding transmission of vibration and noise to the supporting frame 13.

Further in this regard, the chain connection between the driving sprocket 53 and the sprocket 59 on the axle 61 is contained, at least in part, in a gearcase or gear box 131 which is fixedly mounted to the frame 13 and which, in particular, is mounted to a part of the frame tunnel portion 21 which is apertured to permit passage from the tunnel 22 to the gear box 131 of the axle 61. While other arrangements could be employed, in the illustrated construction, the gearcase 131 is connected to the frame tunnel portion 21 by bolts 133 which also assemble a bearing housing or mounting structure 137. The gear box 131 can also be fixed to other parts of the frame 13.

The housing 137 includes a flanged housing member 139 and a plate 141 which sandwiches therebetween the gearcase 131 and the frame tunnel portion 21 and which are bored at 143 for passage therethrough of the axle 61. In addition, the housing member 139 and the plate 141 include an annular cavity which is defined, in the housing 137, by a counterbore including a portion which extends in the plate 141 for a relatively short distance along the axis of the axle 61, and a portion which extends in the housing member 139 for a relatively long distance along the axle axis.

The cavity therefore includes a cylindrical outer wall 147 and two axially spaced annular end walls 149 extending radially inwardly from the outer wall 147.

Located at least partially in the cavity is a bearing retainer or structure 151 which includes a cylindrical wall 153 and two axially spaced annular end walls 157 extending radially inwardly from the ends of the cylindrical wall 153. Supported within the retainer 151 are one or more ball bearing units 159 which directly engage and support the axle 61.

In particular accordance with the invention, means are located in said cavity and extend between the housing 137 and the retainer 151 for preventing transmission of sound and vibration from the retainer 151 to the housing 137 and for simultaneously preventing displacement of the retainer 151 relative to the housing 137. While various means could be employed, in the illustrated construction, such means comprises a bushing 161 of sound and vibration isolating material and means for restricting deformation of the material. More specifically, in the illustrated construction, the bushing 161 is contained between the bearing retainer 151 and the housing 137 and is formed of rubber or other like material which effectively isolates the bearing retainer 151 from the housing 137 while maintaining dimensional stability under load. Further in this regard, the bushing 161 includes a cylindrical portion 163 and two axially spaced end portions 167 which extend radially inwardly from the ends of the cylindrical portion 163 and between the radially inwardly extending end walls 149 and 157 of the housing 137 and the bearing retainer 151.

While other constructions can be employed in accordance with the invention, in the illustrated construction, the bearing retainer 151 is formed of two oppositely formed half sections 169 and the bushing 161 is provided by bonding of two half portions 171 to the outer surface of the bearing retainer half sections 169.

It will be noted that the bushing 161 has free surfaces 173 affording unrestricted deformation only at the radially inner ends of the bushing end portions 167. Thus, the construction permits little or no opportunity for deformation or displacement of the cylindrical bushing portion 163 and vibration and noise isolation is obtained without adversely affecting dimensional stability of the axle 61 with respect to the frame. Specifically, the rubber bushing 161 prevents transmission of noise or vibration from the axle 61 to the frame 13.

A similar construction is employed to mount the shaft 52 supporting the upper or drive chain sprocket 53 and the secondary pulley 49 of the variable speed transmission 43 so as to prevent vibration or noise transmission from the shaft 53 to the frame 13. More specifically, at its upper end, the gear box 131 is apertured to receive therein a part of a bearing housing 181 having a flange 183 which is bolted or otherwise fixed to the gear box 131. The bearing housing 181 includes a bore through which the shaft 52 extends, together with a counterbore defined by a radially extending end wall 187 and a cylindrical wall 189 extending from the radially outer margin of the end wall 187. Located within the bearing housing 181 is a bearing retainer 191 including an outer cylindrical wall 193 and an annular end wall 197 extending radially inwardly from one end of the cylindrical wall 193. Supported within the retainer 191 are two ball bearing units 199 which, in turn, support the shaft 52 and which are axially spaced at a substantial distance by a sleeve 211. The bearing retainer 191 is inserted into the bearing housing 181 so that the retainer end wall 197 is located at the other end of the bearing housing 181 from the housing end wall 187.

Contained between the bearing housing 181 and the bearing retainer 191 is a bushing 213 of rubber or other like material, which bushing 213 serves to prevent transmission of vibration or noise from the bearing retainer 191 to the bearing housing 181, gear box 131, and frame 13, and which will substantially maintain dimensional stability between the bearing housing 181 and the bearing retainer 191. While various arrangements could be employed, in the illustrated construction, the bearing 213 is bonded to the outer surface of the retainer cylindrical wall 193 and includes a cylindrical portion 215 and an annular portion 217 which extends radially inwardly from the cylindrical portion 215 at the end of the bearing retainer 191 opposite from the retainer end wall 197 and radially inwardly beyond the inner surface of the retainer cylindrical wall 193 between the adjacent ball bearing unit 199 and the annular end wall 187 of the bearing housing 181. It is noted that one of the ball bearing units 199 is engaged against the retainer end wall 197 and maintained in such position by engagement with the sleeve 211 which, in turn, is engaged by one side of the other one of the ball bearing units 199. In turn, the other side of the other ball bearing unit is engaged by the radially inwardly extending annular portion 217 of the bushing 213, which annular bushing portion 217, in turn, is engaged, on its other side, by the radially inwardly extending end wall 187 of the bearing housing 191.

The radially inwardly extending annular portion 217 of the bushing 213 serves to limit both axial and radial movement of the bearing units 199, thereby retaining stability of the bearing units 199 relative to the housing 181. In addition, the axial length of the bushing 213 is sufficiently great so that, in cooperation with the annular portion 217, substantial deformation of the cylindrical portion 215 of the bushing 213 does not occur, notwithstanding that one end of the bushing cylindrical portion 215 is unrestricted with respect to possible deformation axially outwardly from between the bearing housing 181 and the bearing retainer 191.

Means are also provided in the gear box 131 for facilitating training of the chain 57 around the sprockets 53 and 59 and for removing slack from the chain 57, while at the same time, for preventing vibration and noise or sound transmission to the gear box 131 and frame 13. While other constructions could be employed, in the illustrated construction, such means comprises an idler sprocket 221 which is mounted on a shaft 223 extending eccentrically from a cylindrical hub 227 projecting through a cylindrical aperture in the gear box 131. Adjustment of the position of the idler sprocket 221 is obtained by rotating the hub 227 relative to the gearcase 131.

Noise and vibration transmission are prevented by use of a bushing 229 of rubber or other like material, which bushing 229 includes a cylindrical portion 231 interposed between the hub 227 on the shaft 223 and the aperture and a radially outwardly extending flange portion 237 which extends between an enlarged head 129 on the hub 227 and the margin of the gear box outer surface extending circumferentially around the aperture.

Means are also provided for clamping the idler sprocket 221 in adjusted position relative to the chain 57 so as to remove slack therein, while simultaneously avoiding transmission of sound or noise and vibration from the idler sprocket 221 to the gear box 131 and hence to the frame 13. While other arrangements could be employed, the illustrated construction employs a bridging clamp member 241 which extends diametrically across the head 239 and is bolted at 240 or otherwise secured to the gear box 131 outwardly of the head 239 so as to bear against the head 239 and thereby prevent rotary movement of the hub 227 and shaft 223 relative to the gear box 131 and consequent movement of the idler sprocket 221. A pad 243 of rubber or rubber-like material is interposed between the clamp member 241 and the head 239 to prevent sound or noise and vibration transmission from the idler sprocket 221 to the gear box 131 and frame 13, notwithstanding clamping of the idler sprocket 221 in adjusted position.

The end of the axle 61 remote from the gear box 131 is supported by ball bearing units 251 which, in turn, are supported in like manner to the arrangement for supporting and housing the bearing units 159. More particularly, the bearing units 251 are supported by a retainer 253 which is isolated from a housing 257 by a bushing 259 of rubber or rubber-like material. The housing 257 comprises a housing member 261 which includes a counterbore and a flange 263 extending radially outwardly from one end of the counterbore. The counterbore is closed to define a cavity containing the bushing 259, the retainer 253, and the bearing units 251 by a plate 267 which engages the flange 263. In assembly, the housing member 261 and plate 267 are bolted as a unit to the adjacent wall part of the frame tunnel portion 21.

According to another aspect of the invention, noise emanation associated with engine operation is substantially reduced by controlling or regulating gas flow relative to the engine 31. In this regard, gas flow to and from the engine 31 in the compartment 29 is controlled to minimize sound emanation.

More specifically, the hood 27 is provided along its edge with a gasket or seal 271 of rubber or rubber-like material so that when the hood 27 is connected to both the forward frame portion 17 and the partition 19, the resulting compartment 29 is closed or air tight, except as will be explained. In addition, the interior surfaces defining the compartment 29 can be provided with a sound absorbing lining 273.

As the engine 31 requires air both for operation and for cooling, the walls defining the compartment 29 are provided with a baffled entering air inlet 277. Such a baffled inlet 277 affords ease of in-flow while preventing rectilinear transmission of sound waves outwardly from the compartment. In the illustrated construction, the hood 27 includes the baffled entering air inlet 277.

In accordance with the invention, there is also provided, within the compartment 29, a carburetor air silencer 279 which is mounted from the frame 13 and which can be of generally conventional construction. The silencer 279 includes an inlet 281 arranged to communicate with the compartment 29 and outlet 283 communicating with the engine 31. Use of such a carburetor air silencer 279 serves to materially reduce noise emanation within the compartment 29.

Also in accordance with the invention, the shroud 39 which guides cooling air over the engine 31 is formed so as to include an inlet 287 communicating with the compartment 29 and outlet 289 which communicates with a conduit or passageway 291 which extends circuitously with the compartment 29 and which, in turn, communicates through the partition 19 with a duct or passage 293 which extends rearwardly between the seat 25 and the track 23 and which includes a rearward outlet 297. Accordingly, cooling air from the engine 29 is ducted from the compartment 29 through a tortuous path extending through the conduit 291 and the duct 293 to the outlet 297 rearwardly of the operator. Thus, the conduit 291 in cooperation with the shroud 39 effectively divides the engine compartment 29 into an air supply chamber into which ambient air is introduced for engine operation and cooling and an exiting air chamber in the form of the conduit 291 into which air is discharged from the shroud 39. The fan 37 which forces air through the shroud 39 can be located anywhere in the cooling air passage system.

Still further in accordance with the invention, there is provided within the compartment 29 an exhaust gas muffling system or arrangement including one or more mufflers 311 which are supported from the frame 13 in the compartment 29, which mufflers 311 can be of conventional construction and communicate with the engine 29 and with one or more outlet pipes 313 which extend through the bottom of the frame 13 for discharge of exhaust gases underneath the snowmobile 11. The outlet pipe 313 can be arranged to discharge exhaust gases from travel rearwardly through the frame tunnel portion 21.

As a consequence of the features described above, air entering the compartment 29 is ducted to avoid, as a consequence of such entry, emanation from the compartment 29 of noise associated with engine operation. In addition, use of the carburetor air inlet silencer 279 and the exhaust muffler arrangement or system diminishes noise level within the compartment. Ducting of the cooling air through the circuitous passage arrangement or system prevents rectilinear emanation of noise with the exiting cooling air and rearward location of the exiting air outlet 297 further serves to diminish the noise level in the area of the operator. Discharge of the exhaust gases underneath the snowmobile 11 also serves to reduce the noise level associated with snowmobile operation. Further, the engine and drive train mounting arrangments or systems substantially minimize direct transmission to the frame 13 from the engine 31 and drive train 40 of noise and vibration associated with snowmobile operation.

While it is preferred to employ, in combination, all of the foregoing enumerated features in order to obtain a snowmobile in which noise emanation is minimized, at least some of the advantages of the invention can be obtained by using one or more of the above enumerated features independently of other features.

Various of the features of the invention are set forth in the following claims.

1. A snowmobile comprising a frame including a generally horizontally extending forward portion, a tunnel portion extending rearwardly from said forward portion, and a partition extending vertically and transversely of said frame at the rearward end of said forward portion, a seat supported by said frame rearwardly of said partition and above said tunnel, an endless track mounted in said tunnel, a hood cooperating with said partition and with said forward frame portion to define a closed compartment, one of said hood and said frame including baffled air inlet means communicating between said compartment and the atmosphere, an engine mounted in said compartment and including a cooling air shroud having an inlet communicating with the interior of said compartment and an outlet, a fan for delivering cooling air through said shroud, a cooling air exhaust duct extending rearwardly from said partition between said track and said seat and having an outlet adjacent to said rear of said snowmobile, and a cooling air exhaust conduit located in said compartment and communicating through said partition with said duct and with said shroud outlet.

2. A snowmobile in accordance with claim 1 and further including a carburetor air inlet silencer located in said compartment, communicating with said engine, and having an inlet communicating with the interior of said compartment.

3. A snowmobile in accordance with claim 2 and further including an exhaust gas muffling system located in said compartment and including an inlet communicating with said engine, and an outlet extending through said frame for discharge of exhaust gases beneath said frame.

4. A snowmobile in accordance with claim 1 wherein said engine comprises two alternately firing cylinders and a crankshaft and a plurality of rubber mounts supporting said engine from said forward frame portion with the axis of said crankshaft extending transversely of said frame and with the axis of said cylinders located in a generally vertical plane extending transversely of said frame, said resilient mounts being relatively soft in the vertical direction and relatively stiff in the direction transverse to the vertical direction and transverse to the crankshaft axis.

5. A snowmobile in accordance with claim 4 wherein said plurality of resilient mounts include a first pair of resilient mounts located in transversely spaced relation from the engine center of gravity and on one side of said engine and a second pair of resilient mounts located in transversely spaced relation from the engine center of gravity on the other side of said engine, each of said first and second pairs of rubber mounts including one resilient mount located forwardly of the engine center of gravity and a second resilient mount located aft of the engine center of gravity.

6. A snowmobile in accordance with claim 5 and further including a variable speed transmission including a primary pulley mounted on said crankshaft and a secondary pulley mounted from said frame forwardly of said engine.

7. A snowmobile in accordance with claim 6 wherein said secondary pulley has a rotary axis spaced from said crankshaft axis in said direction transverse to the crankshaft axis.

8. A snowmobile comprising a frame including a generally horizontally extending forward portion, a tunnel portion extending rearwardly from said forward portion, and a partition extending vertically and transversely of said frame at the rearward end of said forward portion, a seat supported by said frame rearwardly of said partition and above said tunnel, an endless track in said tunnel, a hood cooperating with said partition and with said forward frame portion to define a closed compartment, one of said hood and said frame including baffled air inlet means communicating between said compartment and the atmosphere, an engine including a cooling air shroud having an inlet communicating with the interior of said compartment and an outlet, resilient means for supporting said engine in said compartment and from said frame and for preventing noise and vibration transmission from said engine to said frame, a fan for delivering cooling air through said shroud, a cooling air exhaust duct extending rearwardly from said partition between said track and said seat and having an outlet adjacent to said rear of said snowmobile, a cooling air exhaust conduit located in said compartment and communicating through said partition with said duct and with said shroud outlet, a drive train connected between said engine and said track, and resilient means for supporting said drive train and said track from said frame and for preventing noise and vibration transmission from said drive train to said frame.

9. A ski and track supported snowmobile comprising a frame including a generally horizontally extending forward portion, a transverse partition extending upwardly from said frame portion, a hood extending from adjacent said frame portion to adjacent said transverse partition and defining with said frame portion and said transverse partition a substantially closed engine compartment, wall means extending in said engine compartment and dividing said engine compartment into an air supply chamber and an exiting air chamber with an opening communicating between said chambers, an internal combustion engine located in said engine compartment and including an exhaust port, cooling air inlet means located in one of said transverse partition, said hood, and said frame portion for introducing ambient cooling air into said air supply chamber, cooling air outlet means in one of said transverse partition, said hood, and said frame portion and remotely spaced from said cooling air inlet means for discharging cooling air from said air exiting chamber, means defining a cooling air passage communicating between said air supply chamber and said exiting air chamber and including said opening defined by said wall means and a shroud extending from said wall means into one of said chambers and defining a cooling air passageway extending around said engine and communicating with said opening, fan means driven by said engine and mounted in said cooling air passage for pumping cooling air from said air supply chamber into said exiting air chamber through said shroud and through said opening, and means communicating with said engine exhaust port for discharging exhaust gas from said snowmobile separately from the discharge of said cooling air from said snowmobile.

* * * * *

PO-1050
(5/69)

UNITED STATES PATENT OFFICE
CERTIFICATE OF CORRECTION

Patent No. 3,819,000                    Dated June 25, 1974

Inventor(s)        Robert T. Larsen

It is certified that error appears in the above-identified patent and that said Letters Patent are hereby corrected as shown below:

IN THE SUMMARY OF INVENTION

Column 1, line 31                  Before "According" insert the following new paragraph:

"The invention also provides a ski and track supported snowmobile comprising a hood extending from adjacent a generally horizontal, forwardly extending frame portion to adjacent a transverse partition extending from the frame portion and defining with the frame portion and the transverse partition a substantially closed engine compartment, and wall means extending in the engine compartment and dividing the engine compartment into an air supply chamber and an exiting air chamber with an opening communicating between the chambers, together with an internal combustion engine located in the engine compartment and including an exhaust port. In addition, the snowmobile includes cooling air inlet means for introducing ambient cooling air into the air supply chamber, cooling air outlet means remotely spaced from the cooling air inlet means for discharging cooling air from the air exiting chamber, means defining a cooling air passage communicating between the air supply chamber and the exiting air chamber and including the opening defined by the wall means and a shroud extending from the wall means into one of the chambers and defining a cooling air passageway extending around the engine and communicating with the opening, fan means driven by the engine and mounted in the cooling air passage for pumping cooling air from the air supply chamber into the exiting air chamber through the shroud and through the opening, and means communicating with the engine exhaust port for discharging exhaust gas from the snowmobile separately from the discharge of the cooling air from the snowmobile."

PO-1050
(5/69)

UNITED STATES PATENT OFFICE
CERTIFICATE OF CORRECTION

Patent No. 3,819,000      Dated June 25, 1974

Page - 2

Inventor(s) Robert T. Larsen

It is certified that error appears in the above-identified patent and that said Letters Patent are hereby corrected as shown below:

Column 4, line 18,      "sligtly" should be ---slightly---.

Column 6, line 18,      "bearing" should be ---bushing---.

Column 6, line 36,      "191" should be ---181---.

Column 7, line 1,      "129" should be ---239---.

Signed and Sealed this twenty-fifth Day of November 1975

[SEAL]

Attest:

RUTH C. MASON
*Attesting Officer*

C. MARSHALL DANN
*Commissioner of Patents and Trademarks*